(12) United States Patent
Hogan et al.

(10) Patent No.: US 10,986,810 B2
(45) Date of Patent: Apr. 27, 2021

(54) FEED BIN MONITORING SYSTEM

(71) Applicant: The GSI Group, LLC, Assumption, IL (US)

(72) Inventors: Alan C. Hogan, Assumption, IL (US); Brad K. Eversole, Assumption, IL (US)

(73) Assignee: The GSI Group LLC, Assumption, IL (US)

( * ) Notice: Subject to any disclaimer, the term of this patent is extended or adjusted under 35 U.S.C. 154(b) by 288 days.

(21) Appl. No.: 16/090,777

(22) PCT Filed: Mar. 23, 2017

(86) PCT No.: PCT/IB2017/000282
§ 371 (c)(1),
(2) Date: Oct. 2, 2018

(87) PCT Pub. No.: WO2017/175050
PCT Pub. Date: Oct. 12, 2017

(65) Prior Publication Data
US 2020/0323169 A1    Oct. 15, 2020

Related U.S. Application Data

(60) Provisional application No. 62/319,602, filed on Apr. 7, 2016.

(51) Int. Cl.
*A01K 5/02*    (2006.01)
*G01G 17/00*    (2006.01)
(Continued)

(52) U.S. Cl.
CPC ............ *A01K 5/0283* (2013.01); *G01F 23/20* (2013.01); *G01G 17/00* (2013.01); *G01G 21/23* (2013.01); *G01G 21/28* (2013.01); *G01G 23/002* (2013.01)

(58) Field of Classification Search
CPC ........ G01G 3/14; G01G 3/1402; G01G 13/16; G01G 19/52; G01G 21/23; G01G 21/28;
(Continued)

(56) References Cited

U.S. PATENT DOCUMENTS 4,044,920 A    8/1977    Swartzendruber
4,738,135 A    4/1988    Cadwell et al.
(Continued)

FOREIGN PATENT DOCUMENTS

WO    2012/092334 A1    7/2012

OTHER PUBLICATIONS

UK Intellectual Property Office, International Search Report for related UK Application No. GB1607371.0, dated Sep. 12, 2016.
(Continued)

*Primary Examiner* — Randy W Gibson

(57) ABSTRACT

A bin monitoring system is useable with an elevated feed bin having a plurality of legs that support the bin above a pad so that each leg is connected to the pad through a load cell. The system includes an inner leg mount configured to be attached to a leg, the inner leg mount having an upper portion, and an outer bracket mounted on the load cell. The outer bracket receives the inner leg mount such that a bolt aperture in the outer bracket aligns with a bolt aperture in the upper portion of the inner leg mount and is secured with a threaded bolt. Rotation of the threaded bolt moves the inner leg mount toward the outer bracket to lift the leg so that the leg is supported by the load cell.

5 Claims, 4 Drawing Sheets

(51) Int. Cl.
*G01G 23/00* (2006.01)
*G01G 21/23* (2006.01)
*G01F 23/20* (2006.01)
*G01G 21/28* (2006.01)

(58) Field of Classification Search
CPC .... G01G 23/002; G01G 17/00; A01K 5/0225; A01K 5/0283; A01K 5/02; G01F 23/20
See application file for complete search history.

(56) References Cited

U.S. PATENT DOCUMENTS

| | | | |
|---|---|---|---|
| 5,313,022 A * | 5/1994 | Piroozmandi | G01L 1/2231 |
| | | | 177/132 |
| 5,764,522 A | 6/1998 | Shalev | |
| 5,770,823 A | 6/1998 | Piroozmandi | |
| 6,320,142 B1 | 11/2001 | Burton et al. | |
| 7,980,129 B2 * | 7/2011 | Jaeger | G01G 21/23 |
| | | | 73/290 V |
| 8,581,122 B2 * | 11/2013 | Jaeger | G01F 23/20 |
| | | | 177/132 |
| 8,853,566 B2 * | 10/2014 | Jaeger | G01G 21/23 |
| | | | 177/132 |
| 9,310,243 B2 * | 4/2016 | Jaeger | G01G 21/23 |
| 9,651,413 B2 * | 5/2017 | Jaeger | G01G 21/23 |
| 10,082,421 B2 * | 9/2018 | Jaeger | G01G 21/23 |
| 10,416,019 B2 * | 9/2019 | Jaeger | G01F 23/20 |
| 2007/0000320 A1 | 1/2007 | Jaeger et al. | |
| 2012/0090901 A1 | 4/2012 | Jaeger | |
| 2019/0293479 A1 * | 9/2019 | Bouchard | G01G 13/024 |

OTHER PUBLICATIONS

European Patent Office, International Search Report for International Application No. PCT/IB2017/000282, dated Jun. 21, 2017.

* cited by examiner

US 10,986,810 B2

FEED BIN MONITORING SYSTEM

BACKGROUND OF THE INVENTION

Field of Invention

This disclosure relates to feed bin monitors, and more particularly, to feed bin monitors having a load cell that is positioned to measure the amount of feed in the feed bin.

Description of Related Art

Disruptions in the availability of feed at animal finishing facilities may have very serious consequences. These facilities typically use feed bins supplying automated feed delivery systems. In theory, these bins and delivery systems are intended to ensure uninterrupted flow of feed to the animal feeders. However, automated systems still require producers to closely monitor operation of the feed systems to make sure animals are not without feed for extended periods of time. For example, the feed bins that supply the delivery systems must be periodically monitored to determine the level of feed remaining and refilled before the feed runs out. This may involve personally checking each bin by climbing up a ladder to the top of the bin and visually noting and monitoring the feed level in the bin. This is labor-intensive and can be dangerous, especially in poor weather conditions. Also, feed must be ordered, prepared, and delivered before the feed in the bin runs out.

Accordingly, electronic monitors have been devised to monitor feed levels in the feed bins. These known electronic monitors are equipped with load cells positioned on a concrete slab underneath the bin legs. The load cells measure the weight of the bin to determine the amount of the feed in the bin. However, it has been costly and difficult to retrofit existing bins with these monitoring systems. It would be desirable to have a monitoring system that is more easily adaptable to feed bins currently in place.

BRIEF SUMMARY OF THE INVENTION

Briefly stated, the invention is directed to a bin monitoring system useable with an elevated feed bin having a plurality of tower legs that support the feed bin above a mounting pad so that each of the plurality of tower legs is connected to the mounting pad through the bin monitoring system. The bin monitoring system including a load cell and a support plate supporting the load cell and configured to be secured to a mounting pad. The bin monitoring system includes an inner leg mount configured to be attached to a tower leg, the inner leg mount having a leg-facing side and an upper portion, the upper portion having a bolt aperture formed therein. The bin monitoring system also has an outer bracket mounted on the load cell. The Outer bracket has an upper portion and a bottom portion, the upper portion having a bolt aperture formed therein, the bottom portion having downward extending flanges. The outer bracket receives the inner leg mount such that the bolt aperture of the outer bracket aligns with the bolt aperture of the inner leg mount, and the two apertures receive a threaded bolt for securing the inner leg mount to the outer bracket. Rotation of the threaded bolt in a first direction moves the upper portion of the inner leg mount toward the upper portion of the outer bracket so that the tower leg is supported by the load cell, and rotation of the threaded bolt in a second direction moves the upper portion of the inner leg mount away from the upper portion of the outer bracket.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

Corresponding reference characters indicate corresponding parts throughout the several views of the drawings.

DESCRIPTION OF PREFERRED EMBODIMENTS

Figure 1:
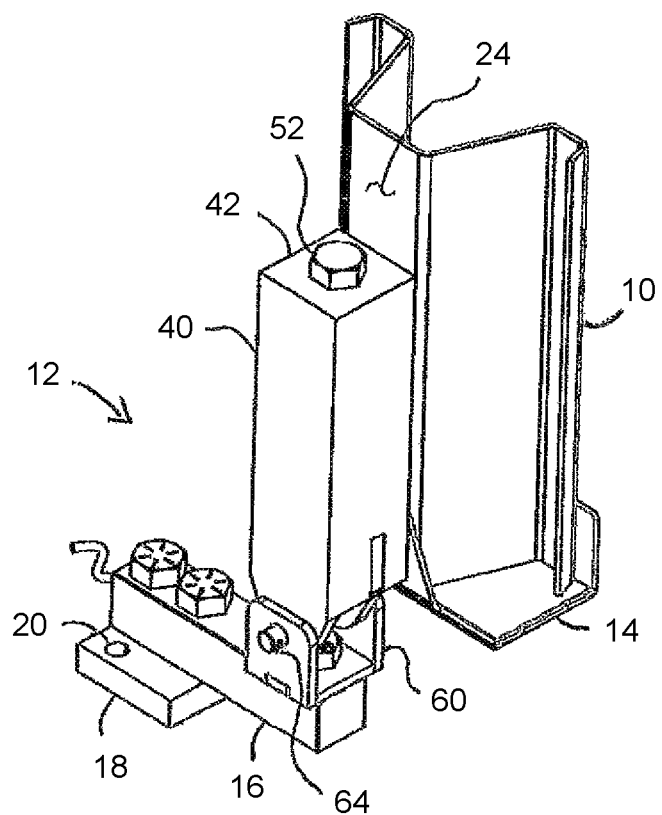
FIG. 1 is a perspective view of a portion leg of a feed tank having a feed tank weight monitoring system according to one embodiment of the invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Turning now to the Figures, a lower portion of a tower leg 10 for use with an elevated feed bin is shown in FIG. 1. A bin monitoring system 12 is configured to attach to the portion of the tower leg 10. As would be understood by those skilled in the art, feed bins are supported by a plurality of tower legs 10, only one of which is shown in the Figures. As each of the tower legs 10 and its accompanying components of the bin monitoring system 12 are substantially similar, only one tower leg 10 and the components of the bin monitoring system 12 associated with that leg 10 will be shown and described herein. As is customary, the tower leg 10 may sit on conventional front and back leg anchor plates 14. Front and back anchor plates 14 have customarily been used to attach the tower leg 10 to a mounting pad (not shown) such as a concrete slab. The bin monitoring system 12 is placed alongside the tower leg 10 and has a load cell 16 and a support plate 18 supporting the load cell 16 that is bolted to the mounting pad with one or more anchor bolts (not shown) using bolt apertures 20. Using the bin monitoring system 12, the tower leg 10 is no longer directly connected to the mounting pad, but is instead connected to the mounting pad through the load cell 16 of the bin monitoring system 12 so that the bin monitoring system 12 can detect the weight of the feed bin and monitor its contents.

Figure 2:
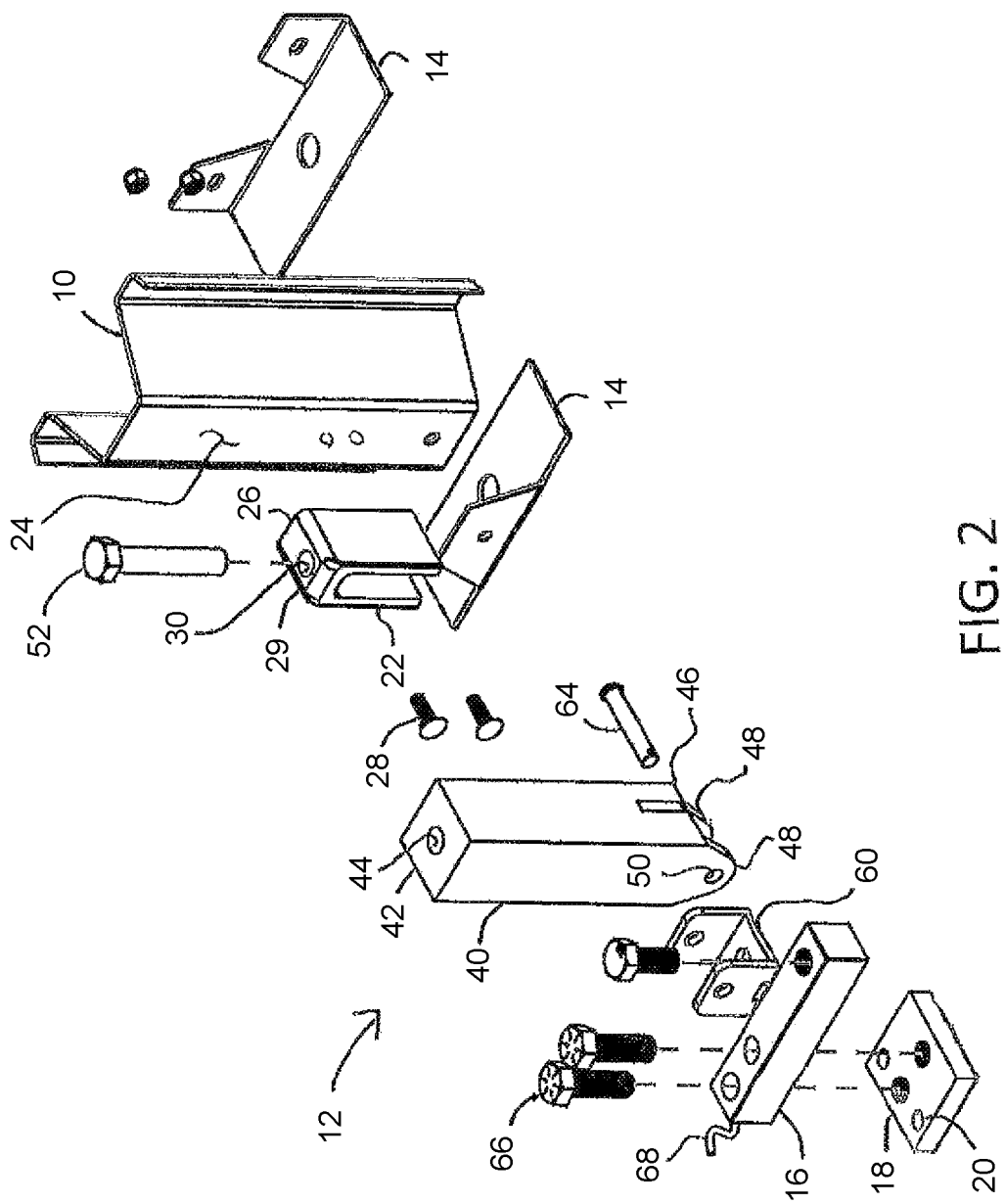
FIG. 2 is an exploded perspective view of the feed tank weight monitoring system of FIG. 1.

Turning also now to FIG. 2, the bin monitoring system 12 includes an inner leg mount 22 attached to a base web 24 of the u-shaped tower leg 10. In the illustrated embodiment, a leg-facing side 26 of the inner leg mount 22 is attached to the tower leg 10 with bolts 28. However, other means of attaching the inner leg mount 22 to the tower leg 10 may be used using sound engineering judgment. The inner leg mount 22 has an upper portion 29 which includes a bolt aperture 30 formed therein.

The bin monitoring system 12 has an outer bracket 40 having an upper portion 42 which includes a bolt aperture 44 formed therein and a bottom portion 46 with parallel downward extending flanges 48. The downward extending flanges 48 have pin apertures 50 formed therein. The outer bracket 40 receives the inner leg mount 22 such that the bolt aperture 44 of the outer bracket 40 aligns with the bolt aperture 30 of the inner leg mount 22, and the two apertures 30, 22 receive a threaded bolt 52 for securing the inner leg mount 22 to the outer bracket 40.

In the illustrated embodiment, the outer bracket 40 is mounted on the load cell 16 with a clevis 60. The clevis 60 is mounted on the load cell 16 with a clevis attachment bolt 62. The downward extending flanges 48 of the outer bracket 40 are pinned to the clevis 60 with a clevis pin 64. Desirably, the weight of the feed bin is passed through the tower leg 10 through the inner leg mount 22 and outer bracket 40 and through the clevis 60 to the load cell 16 such that application of the load is perpendicular to the load cell 16 and any moment forces are not passed to the load cell 16. The load cell 16 is secured to the support plate 18 with bolts 66 or other suitable attachment means.

Figure 3:
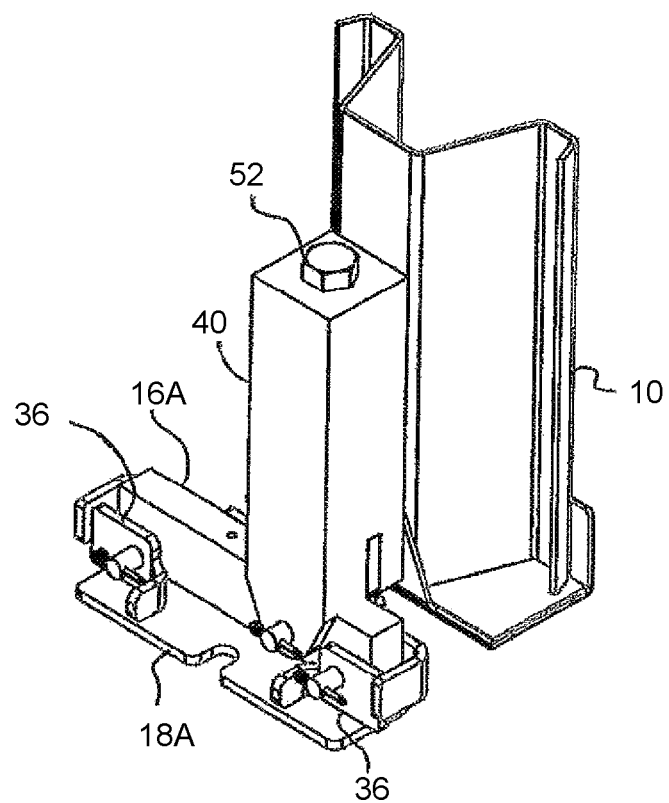
FIG. 3 is a perspective view of another embodiment of a feed tank weight monitoring system.
Figure 4:
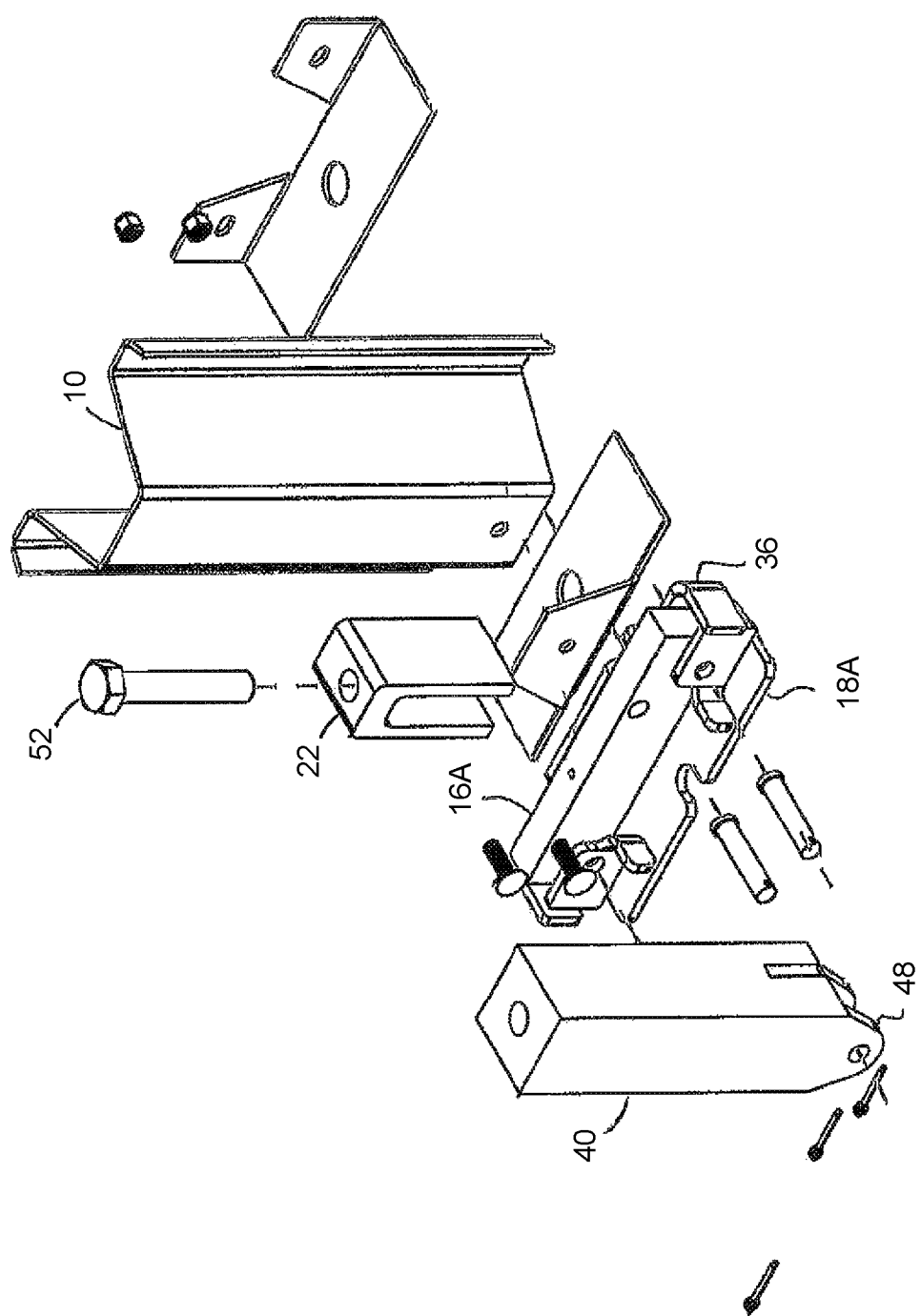
FIG. 4 is an exploded perspective view of the feed tank weight monitoring system of FIG. 3.

FIGS. 1 and 2 illustrate a bending beam type load cell 16 for measuring changing weight of the feed bin. However, as shown in an alternate embodiment in FIGS. 3 and 4, a load cell 16A may be pinned to a support plate 18A at its ends and the outer bracket 40 can be pinned to apply the load to a middle portion of the load cell 16A. In this embodiment, the support plate 18A has mounting tabs 36 that mount the ends of the load cell 16A with a middle portion of the load cell unsupported. The bin monitoring system 12 incorporates the load cell 16 to measure the weight and changes of weight of the feed bin supported by the tower leg 10. In some embodiments, the load cell 16 includes an electrical connection 68 to a transmitter (not shown) such that data collected from the load cell 16 can be accessed via a remote location-such as, for example, by a wired, wireless, or mobile telephone or using a network such as the Internet.

As described above, the bin monitoring system 12 includes the threaded bolt 52 or the like, which secures the inner leg mount 22 to the outer bracket 40. The threaded bolt 52 also serves as a jack to lift the tower leg 10 when the tower leg 10 is suspended off of the mounting pad. Desirably, when lifting the tower leg 10, the threaded bolt 52 is rotated to lift the inner leg mount 22 until the upper portion 29 of the inner leg mount 22 is adjacent the upper portion 42 of the outer bracket 40 to lock the two components so they act as a single solid, rigid member. In some embodiments, the bin monitoring system 12 supports the tower leg 10 between about 0.5 and 2.0 inches above the mounting pad. Because installing the bin monitoring system 12 does not require the tower legs 10, and thus the feed bin, to be significantly lifted, existing feed bins may be retrofitted without having to empty the bin or disconnect flex augers and associated piping.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A bin monitoring system useable with an elevated feed bin having a plurality of tower legs that support the feed bin above a mounting pad so that each of the plurality of tower legs is connected to the mounting pad through the bin monitoring system, the bin monitoring system comprising:
   a load cell;
   a support plate supporting the load cell and configured to be secured to a mounting pad;
   a threaded bolt;
   an inner leg mount configured to be attached to a tower leg, the inner leg mount having a leg-facing side and an upper portion, the upper portion having a bolt aperture formed therein; and
   an outer bracket mounted on the load cell, the outer bracket having an upper portion and a bottom portion, the upper portion having a bolt aperture formed therein, the bottom portion having downward extending flanges, wherein the outer bracket receives the inner leg mount such that the bolt aperture of the outer bracket aligns with the bolt aperture of the inner leg mount, and the two apertures receive the threaded bolt for securing the inner leg mount to the outer bracket and wherein rotation of the threaded bolt in a first direction moves the upper portion of the inner leg mount toward the upper portion of the outer bracket and rotation of the threaded bolt in a second direction moves the upper portion of the inner leg mount away from the upper portion of the outer bracket.

2. The bin monitoring system of claim 1 further comprising a clevis mounted on the load cell, wherein the outer bracket is pinned to the clevis with a clevis pin.

3. The bin monitoring system of claim 1 wherein the load cell is pinned to the support plate at opposite ends of the load cell and the outer bracket is pinned to a middle portion of the load cell.

4. The bin monitoring system of claim 1 wherein the threaded bolt is rotated to lift the inner leg mount until the upper portion of the inner leg mount is adjacent the upper portion of the outer bracket.

5. A combination tower leg and bin monitoring system useable with an elevated feed bin having a plurality of tower legs that support the feed bin above a mounting pad so that each of the plurality of tower legs is connected to the mounting pad through the bin monitoring system, the combination comprising:
   at least one tower leg;
   a bin monitoring system comprising:
      a load cell;

a support plate supporting the load cell and configured to be secured to a mounting pad;

a threaded bolt;

an inner leg mount configured to be attached to the at least one tower leg, the inner leg mount having a leg-facing side and an upper portion, the upper portion having a bolt aperture formed therein; and an outer bracket mounted on the load cell, the outer bracket having an upper portion and a bottom portion, the upper portion having a bolt aperture formed therein, the bottom portion having downward extending flanges, wherein the outer bracket receives the inner leg mount such that the bolt aperture of the outer bracket aligns with the bolt aperture of the inner leg mount, and the two apertures receive the threaded bolt for securing the inner leg mount to the outer bracket and wherein rotation of the threaded bolt in a first direction moves the upper portion of the inner leg mount toward the upper portion of the outer bracket and rotation of the threaded bolt in a second direction moves the upper portion of the inner leg mount away from the upper portion of the outer bracket.

\* \* \* \* \*